US009108339B2

(12) United States Patent
Schmidt et al.

(10) Patent No.: US 9,108,339 B2
(45) Date of Patent: Aug. 18, 2015

(54) METHOD FOR THE PRODUCTION OF COATED MOLDINGS

(75) Inventors: Arne Schmidt, Darmstadt (DE); Christian Eberle, Griesheim (DE); Marc Poth, Reinheim (DE); Klaus Albrecht, Mainz (DE); Erwin Buerkle, Benediktbeuern (DE); Martin Eichlseder, Tettenweis (DE)

(73) Assignees: Evonik Röhm GmbH, Darmstadt (DE); Krauss Maffei Technologies GmbH, München (DE)

( * ) Notice: Subject to any disclaimer, the term of this patent is extended or adjusted under 35 U.S.C. 154(b) by 411 days.

(21) Appl. No.: 12/682,405

(22) PCT Filed: Aug. 18, 2008

(86) PCT No.: PCT/EP2008/060783
§ 371 (c)(1),
(2), (4) Date: Apr. 9, 2010

(87) PCT Pub. No.: WO2009/053130
PCT Pub. Date: Apr. 30, 2009

(65) Prior Publication Data
US 2010/0213636 A1    Aug. 26, 2010

(30) Foreign Application Priority Data

Oct. 25, 2007  (DE) .......................... 10 2007 051 482

(51) Int. Cl.
B29C 37/00  (2006.01)
B29C 45/16  (2006.01)
B29C 45/73  (2006.01)
B29K 33/00  (2006.01)
B29K 79/00  (2006.01)
B29C 67/24  (2006.01)

(52) U.S. Cl.
CPC ......... *B29C 37/0028* (2013.01); *B29C 45/1679* (2013.01); *B29C 45/73* (2013.01); *B29C 67/246* (2013.01); *B29C 2045/735* (2013.01); *B29C 2045/7343* (2013.01); *B29C 2045/7368* (2013.01); *B29K 2033/12* (2013.01); *B29K 2079/08* (2013.01)

(58) Field of Classification Search
CPC .. B29C 37/0028; B29C 45/73; B29C 45/1679
USPC ........................................ 264/255, 347, 348
See application file for complete search history.

(56) References Cited

U.S. PATENT DOCUMENTS

| 3,804,362 | A | 4/1974 | Stromblad et al. |
| 4,439,492 | A | 3/1984 | Wada et al. |
| 4,833,221 | A | 5/1989 | Albrecht |
| 5,110,877 | A | 5/1992 | Hoess et al. |
| 5,155,172 | A | 10/1992 | Siol et al. |
| 5,219,931 | A | 6/1993 | Siol et al. |
| 5,270,397 | A | 12/1993 | Rhein et al. |
| 5,280,073 | A | 1/1994 | Siol et al. |
| 5,530,080 | A | 6/1996 | Siol et al. |
| 5,548,033 | A | 8/1996 | Vetter et al. |
| 5,612,417 | A | 3/1997 | Rhein et al. |
| 5,652,316 | A | 7/1997 | May et al. |
| 5,705,189 | A | 1/1998 | Lehmann et al. |
| 5,705,793 | A | 1/1998 | Kitaichi et al. |
| 5,726,245 | A | 3/1998 | Numrich et al. |
| 6,040,387 | A | 3/2000 | Albrecht et al. |
| 6,203,731 | B1 * | 3/2001 | Kato et al. ............. 264/40.6 |
| 6,214,942 | B1 | 4/2001 | Siol et al. |
| 6,287,470 | B1 | 9/2001 | Vetter et al. |
| 6,355,712 | B1 | 3/2002 | Schultes et al. |
| 6,576,255 | B1 | 6/2003 | Petereit et al. |
| 6,613,871 | B2 | 9/2003 | Hoess et al. |
| 6,765,046 | B1 | 7/2004 | Numrich et al. |
| 6,803,416 | B2 | 10/2004 | Schultes et al. |
| 6,809,163 | B2 | 10/2004 | Schultes et al. |
| 6,890,993 | B2 | 5/2005 | Schultes et al. |
| 6,936,206 | B1 * | 8/2005 | Satoh et al. ............. 264/255 |
| 6,998,140 | B2 | 2/2006 | Meier et al. |
| 7,179,852 | B2 | 2/2007 | Schultes et al. |

(Continued)

FOREIGN PATENT DOCUMENTS

| DE | 101 36 678 | 2/2003 |
| EP | 1 207 031 | 5/2002 |

(Continued)

OTHER PUBLICATIONS

Machine english translation of JP 2003-019731 from the Japanese Patent Office.*

(Continued)

*Primary Examiner* — Edmund Lee
(74) *Attorney, Agent, or Firm* — Oblon, McClelland, Maier & Neustadt, L.L.P.

(57) ABSTRACT

The present invention relates to a process for the production of coated mouldings, by injecting a moulding composition into an injection mould and cooling the composition to obtain a moulding, and altering the injection mould in such a way as to produce an intermediate space between a surface to be coated of the moulding and the inner surface of the injection mould, and using injection moulding to charge a reactive mixture to the resultant intermediate space, where the temperature of at least a portion of the injection mould is increased for the curing of the reactive mixture.

The present invention moreover describes a system for the conduct of the process described above.

18 Claims, No Drawings

(56) References Cited

U.S. PATENT DOCUMENTS

| | | | |
|---|---|---|---|
| 7,371,795 | B2 | 5/2008 | Wicker et al. |
| 7,381,552 | B2 | 6/2008 | Menzler et al. |
| 7,456,239 | B2 | 11/2008 | Theil et al. |
| 7,498,044 | B2 | 3/2009 | Petereit et al. |
| 7,498,373 | B2 | 3/2009 | Schmitt et al. |
| 7,585,565 | B2 | 9/2009 | Schultes et al. |
| 7,605,193 | B2 | 10/2009 | Schultes et al. |
| 7,682,698 | B2 | 3/2010 | Schultes et al. |
| 7,683,131 | B2 | 3/2010 | Goldacker et al. |
| 7,695,813 | B2 | 4/2010 | Schultes et al. |
| 7,754,317 | B2 | 7/2010 | Neuhaeuser et al. |
| 7,879,938 | B2 | 2/2011 | Hager et al. |
| 8,268,939 | B2 | 9/2012 | Ebbrecht et al. |
| 2002/0160042 | A1 | 10/2002 | Petereit et al. |
| 2004/0041303 | A1* | 3/2004 | Kim et al. .................. 264/320 |
| 2004/0104501 | A1 | 6/2004 | Petereit et al. |
| 2005/0080188 | A1 | 4/2005 | Schultes et al. |
| 2005/0156351 | A1* | 7/2005 | Straus et al. ................. 264/236 |
| 2006/0052515 | A1 | 3/2006 | Schultes et al. |
| 2006/0076712 | A1 | 4/2006 | Yonemochi et al. |
| 2006/0118999 | A1 | 6/2006 | Cooper et al. |
| 2006/0121248 | A1 | 6/2006 | Lorenz et al. |
| 2006/0175735 | A1 | 8/2006 | Hoess et al. |
| 2006/0281887 | A1 | 12/2006 | Petereit et al. |
| 2007/0055017 | A1 | 3/2007 | Schultes et al. |
| 2007/0222117 | A1 | 9/2007 | Hoess et al. |
| 2007/0276093 | A1 | 11/2007 | Schultes et al. |
| 2008/0132627 | A1 | 6/2008 | Schultes et al. |
| 2008/0161469 | A1 | 7/2008 | Hoss et al. |
| 2008/0248298 | A1 | 10/2008 | Numrich et al. |
| 2008/0281023 | A1 | 11/2008 | Numrich et al. |
| 2008/0305335 | A1 | 12/2008 | Schultes et al. |
| 2009/0043044 | A2 | 2/2009 | Schwarz-Barac et al. |
| 2009/0105399 | A1 | 4/2009 | Schultes et al. |
| 2009/0176928 | A1 | 7/2009 | Schultes et al. |
| 2009/0226730 | A1 | 9/2009 | Hoess et al. |
| 2010/0098907 | A1 | 4/2010 | Schultes et al. |
| 2010/0098908 | A1 | 4/2010 | Schultes et al. |
| 2010/0148401 | A1 | 6/2010 | Schultes et al. |
| 2010/0167045 | A1 | 7/2010 | Schultes et al. |
| 2010/0174022 | A1 | 7/2010 | Schultes et al. |
| 2010/0189983 | A1 | 7/2010 | Numrich et al. |
| 2011/0009539 | A1 | 1/2011 | Goldacker et al. |
| 2011/0230610 | A1 | 9/2011 | Schultes et al. |
| 2011/0269883 | A1 | 11/2011 | Battenhausen et al. |
| 2011/0290300 | A1 | 12/2011 | Battenhausen et al. |
| 2012/0322932 | A1 | 12/2012 | Schultes et al. |

FOREIGN PATENT DOCUMENTS

| | | |
|---|---|---|
| EP | 1 366 882 | 12/2003 |
| EP | 1 640 134 | 3/2006 |
| EP | 1 666 225 | 6/2006 |
| JP | 41-015590 | 11/1963 |
| JP | 2005-218527 | 12/1993 |
| JP | 2003 19731 | 1/2003 |
| JP | 2003-019731 | 1/2003 |
| JP | 2005-74896 | 3/2005 |
| WO | WO 02/10292 A1 | 2/2002 |

OTHER PUBLICATIONS

U.S. Appl. No. 13/375,843, filed Dec. 2, 2011, Schmidt, et al.
U.S. Appl. No. 12/738,033, filed Apr. 14, 2010, Schultes, et al.
U.S. Appl. No. 12/922,627, filed Sep. 14, 2010, Khrenov, et al.
U.S. Appl. No. 11/748,874, filed May 15, 2007, Schultes, et al.
U.S. Appl. No. 13/241,776, filed Sep. 23, 2011, Hoess, et al.
Office Action issued Jul. 16, 2012, in Russian Patent Application No. 2010 120 730.
U.S. Appl. No. 13/579,048, filed Aug. 15, 2012, Schmidt, et al.
U.S. Appl. No. 13/824,624, filed Apr. 18, 2013, Khrenov, et al.
Chinese Office Action Issued Jul. 23, 2012 in Patent Application No. 200880113037.8 (with English translation).
Office Action as received in the corresponding Japanese Patent Application No. 2010-530368 dated Oct. 19, 2012 w/English Translation.
U.S. Appl. No. 14/412,477, filed Jan. 2, 2015, Frank, et al.

\* cited by examiner

METHOD FOR THE PRODUCTION OF COATED MOLDINGS

CROSS-REFERENCE TO RELATED APPLICATIONS

This application is a National Stage of PCT/EP08/060783 filed Aug. 18, 2008 and claims the benefit of German application DE 10 2007 051 482.6 filed Oct. 25, 2007.

The present invention relates to a process for the production of coated mouldings. The present invention moreover describes a system for the conduct of the said process.

Thermoplastic moulding compositions which can by way of example be based on polymethyl methacrylate (PMMA) are used for a very wide variety of applications. For this, the compositions are extruded or injection-moulded to give mouldings.

The mouldings are nowadays widely used for the production of high-performance parts, examples being slidable parts (automobile interiors and automobile exteriors, casings for electronic equipment, e.g. mobile-telephone cases, computer cases, organizer cases, MP3-player cases or television cases), opaque-coloured add-on parts (e.g. in the automobile industry: exterior mirrors, column cladding, mirror triangles) or opaquely coloured consumer articles. The high performance requirements placed upon the surface of mouldings used in these ways make them susceptible to scratching, which is often visually unacceptable. When these mouldings are produced by injection moulding they are particularly susceptible to scratching. Another factor is that economic reasons make it very difficult to vary the colour of the mouldings produced, for example in order to permit easy matching of the colour of the add-on part to the respective automobile, during the production process.

It is moreover possible to alter other properties of the mouldings by modification of the surface. By way of example, a moulding can be provided with a hydrophobic or hydrophilic coating in order, for example, to alter wettability with water or with other liquids. The surface of a moulding can moreover be rendered reflective or anti-reflective. These mouldings can moreover also have dirt-repellent or antibacterial properties, which are often achieved by modification of the surface.

The mouldings described above can be provided with lacquer layers to improve scratch resistance, for colour matching, to modify the level of hydrophobic/hydrophilic properties of the surface, or to modify reflection properties, or else to give the surfaces antimicrobial and/or dirt-repellent properties. However, the traditional application of reactive lacquers is relatively complicated and therefore expensive. These processes have little suitability for the production of mass-produced items.

For this reason, processes have previously been developed which can apply a scratch-resistant layer at relatively low cost to the mouldings by means of injection-moulding processes. By way of example, the publications JP 11300776 and JP 2005074896 describe injection-moulding processes which give a moulding with a scratch-resistant layer.

The publication JP 11300776 (Dainippon Toryo, 1998) describes a two-stage RIM process. Metathesis-RIM is first used to obtain a moulding from dicyclopentadiene. After hardening, the movable part of the RIM mould is moved backwards, thus producing a defined gap between moulding and mould. A coating material is then injected in a second RIM process into the said gap, and is composed of acrylic-functionalized urethane oligomers, styrene, and diacrylate crosslinking agents, and also, if appropriate, fillers and pigments ($TiO_2$, talc), and is hardened by a free-radical mechanism at 95° C. for 2 min.

The document JP 2005074896 (Toyota Motor Corp.; Dainippon Toryo Co.) likewise describes a RIM process. A first, traditional injection-moulding step processes a plastic, in particular polycarbonate (PC), to give a sheet-like moulding. The mould then opens around a small gap and within a few seconds a reactive solution composed of acrylate-functionalized urethane oligomers, acrylate crosslinking agents, inhibitors, and an organic peroxide initiator is injected and hardened. The hardening is complete after a few seconds at 95° C., and the composite product is demoulded after 90 s. It has good scratch resistance, adhesion, temperature-cycle resistance and warm-water-cycle resistance. An essential factor in all of the claims is the presence of a urethane oligomer which is composed of isophorone diisocyanate units or of bis(isocyanocyclohexyl)methane units.

The mouldings described above intrinsically have good properties. However, the production process is time-consuming, making the entire process expensive. Another problem of the injection-moulding process described in the publications JP 11300776 and JP 2005074896 is premature polymerization of the reactive mixture in the injection-moulding apparatus, making it difficult to achieve short cycle times by these processes in mass production.

Problems often arise moreover with the operating times of the system, since the injection moulds are often not sufficiently leakproof with respect to the reactive mixtures, and these therefore can come into contact with movable parts of the system.

The long cycle times described above can moreover lead to quality problems with the mouldings produced. In this connection, it may be stated that the moulding compositions are subject to thermal stress in the extruders, and this can lead to degradation of the polymers. The result can be a change by way of example in the mechanical and optical properties of the moulding compositions, e.g. the colour, and also a resultant change in the properties of the mouldings.

Efforts are moreover continuing to improve the scratch resistance and the weathering resistance of the resultant mouldings. There is also a need for provision of a process for the surface modification of mouldings which can adapt the surface properties of mouldings to a very wide variety of requirements. By way of example, the process should in particular permit the production of hydrophobic or hydrophilic coatings, in order by way of example to alter wettability with water or with other liquids. The process should moreover allow the surface to be rendered reflective or anti-reflective. It should moreover be possible to equip the moulding with dirt-repellent or antibacterial properties.

In the light of the prior art, it was now an object of the present invention to provide a process which can produce coated mouldings, and which can be carried out simply and at low cost. The moulding here should be obtained using minimum cycle times and with relatively low total energy consumption.

The process should moreover be capable of giving mouldings with excellent mechanical properties. In particular, the mouldings should exhibit high scratch resistance and hardness. The coated mouldings should moreover have high weathering resistance and high chemicals resistance. The process should moreover be capable of producing mouldings with high precision and consistently high quality.

The process should moreover permit maximization of operating time of an injection-moulding system.

These objects, and also other objects which, although not explicitly mentioned, are readily derivable or deducible from the circumstances discussed in the introduction, are achieved by a process with all of the features of patent claim 1. Advantageous embodiments of the inventive process are protected by the dependent claims which refer back to claim 1. With regard to a system for conduct of the process, claim 26 achieves the underlying object.

The present invention accordingly provides a process for the production of coated mouldings, by injecting a moulding composition into an injection mould and cooling the composition to obtain a moulding, and altering the injection moulding in such a way as to produce an intermediate space between a surface to be coated of the moulding and the inner surface of the injection mould, and using injection moulding to charge a reactive mixture to the resultant intermediate space, characterized in that the temperature of at least a portion of the injection mould is increased for the curing of the reactive mixture.

This method successfully provides, in a manner which could not have been foreseen, a process for the production of coated mouldings which can be carried out simply and at low cost. The moulding here can be obtained with very short cycle times and with relatively low total energy consumption.

The inventive process moreover gives mouldings with excellent mechanical properties. In particular, the mouldings can exhibit high scratch resistance and hardness. The surface properties of mouldings can moreover be adapted by the inventive process to a wide variety of requirements. The process can, for example, in particular serve for the production of hydrophilic or hydrophobic coatings, in order by way of example to alter wettability with water or with other liquids. The surface can also be rendered reflective or anti-reflective. The inventive process can also equip a moulding with dirt-repellent or anti-bacterial properties. The coated mouldings moreover have high weathering resistance and high chemicals resistance. The process can moreover produce mouldings with high precision and with consistently high quality. By way of example, mouldings obtainable according to the inventive process exhibit in essence no cracks or similar defects. These mouldings moreover exhibit high surface quality.

The process moreover allows high operating time of an injection-moulding system. Surprisingly, in particular by virtue of the temperature increase for the curing of the reactive mixture, greater impermeability of the system can successfully be achieved. A significant factor here is that the movable parts of the injection-moulding system are not impaired by the curing of the reactive mixture. This is surprising, particularly because the viscosity of the reactive mixture usually falls on heating, thus making the reactive mixture usually more flowable at higher temperatures. The inventive design can moreover minimize thermal degradation of the moulding compositions in the extruder, thus giving mouldings with high and consistent quality.

Injection-moulding processes have been known for a long time and are widely used. A moulding composition is generally injected here into an injection mould and cooled to give a moulding.

According to the invention, the coating process advantageously takes place by virtue of an alteration of the injection mould, where an intermediate space is produced between the surface to be coated of the moulding and the inner surface of the injection mould. Injection moulding can be used to charge a reactive mixture to the intermediate space produced.

The steps described above are described in more detail inter alia in the publications JP 11300776 and JP 2005074896, the disclosure of which is incorporated into the application.

Moulding compositions for the production of the moulding to be coated are known per se, and these moulding compositions comprise thermoplastically processable polymers as obligatory component. Among the preferred polymers are by way of example poly(meth)acrylates, in particular polymethyl methacrylate (PMMA), poly(meth)acrylimides, polyacrylonitriles, polystyrenes, polyethers, polyesters, polycarbonates, polyvinyl chlorides. Poly(meth)acrylates and poly(meth)acrylimides are preferred here. These polymers can be used individually or else as a mixture. These polymers can moreover also take the form of copolymers. Preferred copolymers are inter alia styrene-acrylonitrile copolymers, styrene-maleic acid copolymers and polymethyl methacrylate copolymers, in particular polymethyl methacrylate-poly(meth)acrylimide copolymers.

Particularly preferred moulding compositions have at least 15% by weight, preferably at least 50% by weight and particularly preferably at least 80% by weight, of polymethyl methacrylate, of poly(meth)acrylimide and/or of polymethyl methacrylate copolymers, based on the total weight of the moulding composition.

The moulding compositions of the present invention can preferably comprise poly(meth)acrylates. The expression (meth)acrylates comprises methacrylates and acrylates, and also mixtures composed of both.

Poly(meth)acrylates are polymers obtainable by polymerization of a monomer mixture which has at least 60% by weight, preferably at least 80% by weight, of (meth)acrylates, based on the weight of the monomers. These monomers are well known to persons skilled in the art and are available commercially.

Among these are, inter alia, (meth)acrylic acid and (meth)acrylates which derive from saturated alcohols, e.g. methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, heptyl (meth)acrylate; (meth)acrylates which derive from unsaturated alcohols, e.g. oleyl (meth)acrylate, 2-propynyl (meth)acrylate, allyl (meth)acrylate, vinyl (meth)acrylate, etc.; amides and nitriles of (meth)acrylic acid, e.g. N-(3-dimethylaminopropyl)(meth)acrylamide, N-(diethylphosphono)(meth)acrylamide, 1-methacryloylamido-2-methyl-2-propanol; cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates, such as 1,4-butanediol (meth)acrylate, (meth)acrylates of ether alcohols, e.g. tetrahydrofurfuryl (meth)acrylate, vinyloxyethoxyethyl (meth)acrylate; and polyfunctional (meth)acrylates, such as trimethylolpropane tri(meth)acrylate.

The preparation of the poly(meth)acrylates can also use, alongside the (meth)acrylates described above, other unsaturated monomers copolymerizable with the abovementioned methacrylates. The amount generally used of these compounds, based on the weight of the monomers, is from 0 to 40% by weight, preferably from 0 to 20% by weight, and the comonomers here can be used individually or as a mixture. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene; vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazol, 2-methyl-1-vinylimidazol, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, such as maleic anhydride, methylmaleic anhydride, maleimide, methylmaleimide; and dienes, such as divinylbenzene.

Preferred poly(meth)acrylates are obtainable by polymerization of mixtures which have at least 20% by weight, in particular at least 60% by weight and particularly preferably at least 80% by weight of methyl methacrylate, in each case based on the total weight of the monomers to be polymerized. For the purposes of the present invention, these polymers are termed polymethyl methacrylates. Preferred moulding compositions can comprise various poly(meth)acrylates which differ from one another by way of example in molecular weight or in monomer constitution.

The preparation of the (meth)acrylate homo- and/or copolymers from the monomers described above by the various processes of free-radical polymerization is known per se. For example, the polymers can be prepared by bulk polymerization, solution polymerization, suspension polymerization or emulsion polymerization. Bulk polymerization is described by way of example in Houben-Weyl, Volume E20, Part 2 (1987), pp. 1145 et seq. Useful information with regard to solution polymerization is found on page 1156 et seq. in the same reference. Explanations of suspension polymerization technology are likewise found on page 1149 et seq. of the same reference, while emulsion polymerization is described and explained on page 1150 et seq. of the same reference.

Preferred moulding compositions can moreover encompass poly(meth)acrylimides. Poly(meth)acrylimides have repeat units which can be represented by formula (I)

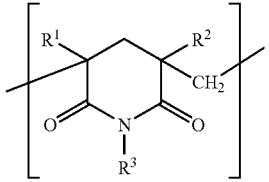

(I)

in which $R^1$ and $R^2$ are identical or different and are hydrogen or a methyl group, and $R^3$ is hydrogen or an alkyl or aryl radical having up to 20 carbon atoms.

It is preferable that units of the structure (I) form more than 30% by weight, particularly preferably more than 50% by weight and very particularly preferably more than 80% by weight, of the poly(meth)acrylimide.

The preparation of poly(meth)acrylimides is known per se and described by way of example in GB Patent 1 078 425, GB Patent 1 045 229, DE Patent 1 817 156 (=U.S. Pat. No. 3,627,711) or DE Patent 27 26 259 (=U.S. Pat. No. 4,139,685).

These copolymers can moreover contain further monomer units which derive by way of example from esters of acrylic or methacrylic acid, in particular with lower alcohols having from 1 to 4 carbon atoms, styrene, maleic acid or its anhydride, itaconic acid or its anhydride, vinylpyrrolidone, vinyl chloride or vinylidene chloride. The proportion of the comonomers which cannot be cyclized or which are very difficult to cyclize is intended to be no more than 30% by weight, preferably no more than 20% by weight and particularly preferably no more than 10% by weight, based on the weight of the monomers.

Moulding compositions that can be used are preferably those which encompass poly(N-methylmethacrylimides) (PMMI) and/or encompass polymethyl methacrylates (PMMA). Poly(N-methylmethacrylimides) (PMMI), polymethyl methacrylates (PMMA) and/or PMMI-PMMA copolymers are preferably copolymers of PMMI and PMMA which are prepared by to some extent cycloimidizing the PMMA. (PMMI prepared by partial imidization of PMMA is usually prepared in such a way that at most 83% of the PMMA used are imidized. The resultant product is termed PMMI, but strictly is a PMMI-PMMA copolymer.) PMMA, and also PMMI or PMMI-PMMA copolymers, are commercially available, e.g. with the trade mark Pleximid from Röhm. An example of a copolymer (Pleximid 8803) has 33% of MMI units, 54.4% of MMA units, 2.6% of methacrylic acid units and 1.2% of anhydride units. The products are known, as also is their preparation (Hans R. Kricheldorf, Handbook of Polymer Synthesis, Part A, Verlag Marcel Dekker Inc. New York—Basel—Hongkong, pp. 223 et seq.; H. G. Elias, Makromoleküle [Macromolecules], Hüthig and Wepf Verlag Basle—Heidelberg—New York; U.S. Pat. Nos. 2,146,209, 4,246,374).

The moulding compositions can moreover encompass styrene-acrylonitrile polymers (SAN). Particularly preferred styrene-acrylonitrile polymers can be obtained by polymerization of mixtures composed of from 70 to 92% by weight of styrene from 8 to 30% by weight of acrylonitrile and from 0 to 22% by weight of other comonomers, in each case based on the total weight of the monomers to be polymerized.

In order to improve impact resistance values, silicone rubber graft copolymers can be admixed with the moulding compositions and are composed of from 0.05 to 95% by weight, based on the total weight of the copolymer, of a core a) composed of an organosilicon polymer whose general formula is $(R_2SiO_{2/2})_x \cdot (RSiO_{3/2})_y \cdot (SiO_{4/2})_z$, where x=from 0 to 99.5 mol %, y=from 0.5 to 100 mol %, z=from 0 to 50 mol %, where R are identical or different alkyl or alkenyl radicals having from 1 to 6 carbon atoms, aryl radicals or substituted hydrocarbon radicals, from 0 to 94.5% by weight, based on the total weight of the copolymer, of a polydialkylsiloxane layer b) and from 5 to 95% by weight, based on the total weight of the copolymer, of an envelope c) composed of organic polymers, which comprises vinyl groups prior to the grafting process, and the envelope c) is obtainable by free-radical polymerization of a mixture which comprises acrylic esters and methacrylates.

The inventive moulding compositions can moreover comprise acrylate rubber modifiers. Surprisingly, this can achieve excellent impact resistance behaviour at room temperature (about 23° C.) of the mouldings produced from the moulding compositions. A particular significant factor is that the mechanical and thermal properties, for example the modulus of elasticity or the Vicat softening point, remain at a very high level. If an attempt is made to achieve similar notched impact resistance behaviour at room temperature merely by using acrylate rubber modifier or silicone rubber graft copolymer, there is a relatively marked reduction in the said values.

These acrylate rubber modifiers are known per se. They are copolymers having a core-and-envelope structure, where the core and the envelope have a high proportion of the (meth) acrylates described above.

Preferred acrylate rubber modifiers here have a structure having two shells of different constitution.

Particularly preferred acrylate rubber modifiers have inter alia the following structure:
Core: Polymer whose proportion of methyl methacrylate is at least 90% by weight, based on the weight of the core.
Shell 1: Polymer whose proportion of butyl acrylate is at least 80% by weight, based on the weight of the first shell.
Shell 2: Polymer whose proportion of methyl methacrylate is at least 90% by weight, based on the weight of the second shell.

By way of example, a preferred acrylate rubber modifier can have the following structure:
Core: Copolymer composed of methyl methacrylate (95.7% by weight), ethyl acrylate (4% by weight) and allyl methacrylate (0.3% by weight)
S1: Copolymer composed of butyl acrylate (81.2% by weight), styrene (17.5% by weight) and allyl methacrylate (1.3% by weight)
S2: Copolymer composed of methyl methacrylate (96% by weight) and ethyl acrylate (4% by weight)

The ratio of core to shell(s) in the acrylate rubber modifiers can vary widely. The ratio by weight of core to shell C/S is preferably in the range from 20:80 to 80:20, with preference from 30:70 to 70:30 in the case of modifiers with one shell, and the ratio of core to shell 1 to shell 2 C/S1/S2 is preferably in the range from 10:80:10 to 40:20:40, particularly preferably from 20:60:20 to 30:40:30 for modifiers having two shells.

The particle size of the acrylate rubber modifiers is usually in the range from 50 to 1000 nm, preferably from 100 to 500 nm and particularly preferably from 150 to 450 nm, with no intention of any resultant restriction.

According to one particular aspect of the present invention, the ratio by weight of silicone rubber graft copolymer to acrylate rubber modifier is in the range from 1:10 to 10:1, preferably from 4:6 to 6:4.

Particular moulding compositions are preferably composed of
f1) from 20 to 95% by weight of poly(meth)acrylates,
f2) from 0 to 45% by weight of styrene-acrylonitrile polymers,
f3) from 5 to 60% by weight of silicone rubber graft copolymers,
f4) from 0 to 60% by weight of acrylate-rubber-based impact modifiers, based in each case on the weight of components f1 to f4, and of conventional additives.

The compositions to be polymerized, the moulding compositions, and the mouldings obtainable therefrom can moreover comprise further well-known additives. Among these additives are inter alia molecular weight regulators, release agents, antistatic agents, antioxidants, mould-release agents, flame retardants, lubricants, dyes, flow improvers, fillers, light stabilizers, pigments, weathering stabilizers and plasticizers.

The amount used of the additives is conventional, i.e. up to 80% by weight, preferably up to 30% by weight, based on the entire composition. If the amount is greater than 80% by weight, based on the entire composition, properties of the plastics can be adversely affected, an example being processability.

The weight-average molar mass Mw of the homo- and/or copolymers to be used according to the invention as matrix polymers can vary widely, and the molar mass here is usually matched to the intended application and to the processing method used for the moulding composition. However, it is generally in the range from 20 000 to 1 000 000 g/mol, preferably from 50 000 to 500 000 g/mol and particularly preferably from 80 000 to 300 000 g/mol, with no intention of any resultant restriction.

For the purposes of the present invention, reactive mixtures are compositions which can be cured by free-radical polymerization. Under injection-moulding conditions, these compositions can be injected into the injection mould, and these compositions are therefore at least temporarily flowable under the said conditions. Reactive mixtures which can be used for the coating process are described inter alia in the publications JP 11300776 and JP 2005074896. The disclosure of the said publications is incorporated by way of reference, and the compositions described in the said publications are incorporated here into the present application.

Particular advantages can in particular be achieved with reactive mixtures which have at least 40% by weight, preferably at least 60% by weight and particularly preferably at least 90% by weight, of (meth)acrylates having at least two double bonds, based on the total weight of the reactive mixture. The term "double bond" in particular means carbon-carbon double bonds capable of free-radical polymerization. The expression "(meth)acrylate" means acrylate, methacrylate, and also mixtures composed of both. (Meth)acrylates having at least two double bonds are also known as crosslinking monomers. Among these are in particular (meth)acrylates having two double bonds such as (meth)acrylates which derive from unsaturated alcohols, e.g. 2-propynyl (meth)acrylate, allyl (meth)acrylate, vinyl (meth)acrylate, and also (meth)acrylates which derive from diols or from alcohols of higher functionality, e.g. glycol di(meth)acrylates, such as ethylene glycol di(meth)acrylate, diethylene glycol di(meth)acrylate, triethylene glycol di(meth)acrylate, tetra- and polyethylene glycol di(meth)acrylate, 1,3-butanediol (meth)acrylate, 1,4-butanediol (meth)acrylate, 1,6-hexanediol di(meth)acrylate, glycerol di(meth)acrylate and diurethane dimethacrylate; (meth)acrylates having three or more double bonds, e.g. glycerol tri(meth)acrylate, trimethylolpropane tri(meth)acrylate, pentaerythritol tetra(meth)acrylate and dipentaerythritol penta(meth)acrylate.

Particularly preferred (meth)acrylates having at least two double bonds are 1,6-hexanediol diacrylate, trimethylolpropane triacrylate, pentaerythritol tetraacrylate and dipentaerythritol pentaacrylate.

According to one particular embodiment, the reactive mixture can encompass at least one (meth)acrylate having three or more double bonds. The proportion of (meth)acrylates having three or more double bonds is preferably at least 10% by weight, particularly preferably at least 25% by weight, with particular preference at least 50% by weight and very particularly preferably at least 90% by weight, based on the weight of the reactive mixture.

Reactive mixtures of particular interest are moreover those which encompass at most 90% by weight, particularly preferably at most 75% by weight, with particular preference at most 50% by weight and very particularly preferably at most 7% by weight, of monomers having two or fewer double bonds.

According to one particular embodiment, the reactive mixture preferably comprises 1,6-hexanediol diacrylate, trimethylolpropane triacrylate and/or pentaerythritol tetraacrylate. Reactive mixtures of particular interest are those which encompass trimethylolpropane triacrylate and pentaerythritol tetraacrylate, where the ratio by weight of trimethylolpropane triacrylate to pentaerythritol tetraacrylate can preferably be in the range from 10:1 to 1:10, with preference in the range from 5:1 to 1:5, with particular preference in the range from 3:1 to 1:3 and very particularly preferably in the range from 2:1 to 1:2.

According to another embodiment, the reactive mixture preferably comprises trimethylolpropane triacrylate and 1,6-hexanediol diacrylate, where the ratio by weight of trimethylolpropane triacrylate to 1,6-hexanediol diacrylate can preferably be in the range from 10:1 to 1:10, with preference in the range from 5:1 to 1:5, with particular preference in the range from 3:1 to 1:3 and very particularly preferably in the range from 2:1 to 1:2.

Reactive mixtures of particular interest are moreover those which preferably encompass pentaerythritol tetraacrylate and 1,6-hexanediol diacrylate. The ratio by weight of pentaerythritol tetraacrylate to 1,6-hexanediol diacrylate can advantageously be in the range from 10:1 to 1:10, with preference in the range from 5:1 to 1:5, with particular preference in the range from 3:1 to 1:3 and very particularly preferably in the range from 2:1 to 1:2.

Surprisingly, reactive mixtures which encompass pentaerythritol tetraacrylate and/or trimethylolpropane triacrylate exhibit particularly high scratch resistance, which increases in particular with the proportion of pentaerythritol tetraacrylate. Reactive mixtures which encompass 1,6-hexanediol diacrylate and/or trimethylolpropane triacrylate exhibit particularly high UV resistance, which can in particular be determined by the xenon test. Mixtures with a high proportion of 1,6-hexanediol diacrylate thus retain high scratch resistance according to the friction-wheel test even after xenon irradiation.

The scratch resistance of the coating depends inter alia on the number of polymerizable double bonds, based on the weight of the mixture. The higher the said proportion, the higher the scratch resistance achievable by the coating. The reactive mixture can accordingly preferably have at least 1 mol of double bond per 120 g of reactive mixture, particularly preferably at least 1 mol of double bond per 105 g of reactive mixture. The scratch resistance here can in particular be raised by using (meth)acrylates having three or more double bonds.

The reactive mixture can in particular be used in reactive injection-moulding processes. Accordingly, the viscosity of the mixture permits this type of use. The dynamic viscosity of the reactive mixture is preferably in the range from 1 to 200 mPa*s at 25° C., particularly preferably in the range from 5 to 50 mPa*s at 25° C., and a possible method here for determining the dynamic viscosity is the Brookfield method (using UL adapter).

For curing, the reactive mixture comprises at least one initiator, which can give free-radical polymerization of the monomers. Thermal initiators are used here, and form free radicals by exposure to heat.

Suitable thermal initiators are inter alia azo compounds, peroxy compounds, persulphate compounds or azoamidines. Non-limiting examples are dibenzoyl peroxide, dicumyl peroxide, cumene hydroperoxide, diisopropyl peroxydicarbonate, bis(4-tert-butylcyclohexyl) peroxydicarbonate, dipotassium persulphate, ammonium peroxydisulphate, 2,2'-azobis (2-methylpropiononitrile) (CA 1BN), 2,2'-azobis (isobutyramidine) hydrochloride, benzopinacol, dibenzyl derivatives, methyl ethylene ketone peroxide, 1,1-azobiscyclohexanecarbonitrile, methyl ethyl ketone peroxide, acetylacetone peroxide, dilauroyl peroxide, didecanoyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, tert-butyl peroxyisobutyrate, tert-butyl peroxyacetate, dicumyl peroxide, 1,1-bis (tert-butylperoxy)cyclohexane, 1,1-bis(tert-butylperoxy)3,3, 5-trimethylcyclohexane, cumyl hydroperoxide, tert-butyl hydroperoxide, bis(4-tert-butylcyclohexyl) peroxydicarbonate, and also the free radical generators obtainable from DuPont with the name ®Vazo, examples being ®Vazo V50 and ®Vazo WS.

The reactive mixture can advantageously comprise from 0.01% by weight to 3% by weight, preferably from 0.1% by weight to 2.5% by weight and particularly preferably from 0.5% by weight to 1.5% by weight, of thermal initiator, based on the weight of the reactive mixture.

A reactive mixture can encompass, in addition to the thermal initiators, photo-initiators, which initiate a free-radical polymerization reaction on irradiation with electromagnetic waves. Surprisingly, the use of reactive mixtures which encompass not only thermal initiators but also photo-initiators can achieve particular advantages. Among these advantages are in particular short cycle times in the production of the coated mouldings, and also particularly high weathering resistance, scratch resistance, and adhesion of the coating.

Among the preferred photo-initiators are inter alia αα-diethoxyacetophenone (DEAP, Upjohn Corp.), n-butyl benzoin ether (®Trigonal-14, AKZO) and 2,2-dimethoxy-2-phenylacetophenone (®Irgacure 651) and 1-benzoylcyclohexanol (®Irgacure 184), bis(2,4,6-trimethylbenzoyl)phenyl-phosphine oxide (®Irgacure 819) and 1-[4-(2-hydroxyethoxy)phenyl]-2-hydroxy-2-phenylpropan-1-one (®Irgacure 2959), each being commercially available from Ciba Geigy Corp.

The proportion of photo-initiator is not per se critical. The reactive mixture preferably has from 0% by weight to 10% by weight, particularly preferably from 0.3% by weight to 5% by weight and particularly preferably from 0.7% by weight to 2.3% by weight, of photo-initiator, based on the weight of the reactive mixture.

According to one preferred embodiment, the ratio by weight of photo-initiator to thermal initiator can be in the range from 20:1 to 1:5, preferably in the range from 15:1 to 1:1 and particularly preferably in the range from 10:1 to 2:1.

The reactive mixture can encompass a lubricant, alongside the abovementioned constituents. Surprisingly, this is successful in giving an improvement in the demouldability of the coated moulding, without reducing the adhesion to critical values. Auxiliaries that can be present therefore comprise lubricants, e.g. those selected from the group of the polysiloxanes, of the saturated fatty acids having fewer than 20 carbon atoms, preferably from 16 to 18 carbon atoms, or of the saturated fatty alcohols having fewer than 20 carbon atoms, preferably from 16 to 18 carbon atoms. It is preferable that small quantitative proportions are present, at most 0.25% by weight, based on the weight of the reactive mixture, for example from 0.05 to 0.2% by weight. Suitable examples are stearic acid, palmitic acid, and industrial mixtures composed of stearic and palmitic acid. Acrylated polysiloxanes are moreover advantageous, an example being 13/6/αω2-hexylacrylsiloxane, and this compound is by way of example marketed by Goldschmidt GmbH as RC 725. Larger amounts of polysiloxanes can also be used. By way of example, proportions of at most 10% by weight are advantageous, preferably at most 1% by weight and very particularly preferably at most 0.5% by weight. Examples of other suitable compounds are n-hexadecanol and n-octadecanol, and also industrial mixtures composed of n-hexadecanol and n-octadecanol. Stearyl alcohol is one particularly preferred lubricant or mould-release agent.

The reactive mixture can moreover encompass conventional additives, such as colorants, pigments, e.g. metallic pigments, UV stabilizers, fillers or nano-materials, in particular ITO nanoparticles. The proportion of these additives depends on the intended application and can therefore be within a wide range. This proportion can preferably be from 0 to 30% by weight, particularly preferably from 0.1 to 5% by weight, if additives are present.

The thickness of the coating often depends on the nature of the reactive mixture and of the moulding. The production of very thin coatings is often technically very demanding. On the other hand, very thick coatings frequently have a severe tendency towards cracking, decreasing adhesion to some extent. Coated mouldings of particular interest are therefore those whose preferred thickness of coating is in the range from 1 μm to 100 μm, preferably from 5 μm to 75 μm, particularly preferably from 8 μm to 50 μm, in particular from 10 μm to 40 μm and very particularly from 15 μm to 30 μm. The thickness of the coating can be adjusted by way of the size of the intermediate space between a surface to be coated of the moulding and the inner surface of the injection mould.

The temperature at which the moulding composition is injected into the injection mould depends in particular on the nature of the polymer, and also of the additives. These processing temperatures are known to the person skilled in the art. The temperature at which the moulding composition is injected into the injection mould is generally in the range from 150 to 350° C., preferably from 220 to 330° C.

The temperature of the mould can likewise be adjusted to the conventional temperature for the respective moulding composition. The moulding composition can preferably be cooled to a temperature in the range from 40 to 160° C., particularly preferably from 70 to 150° C. and very particularly preferably from 60 to 80° C., before the reactive mixture is injected into the intermediate space.

The temperature at which the thermal curing of the reactive mixture takes place depends on the nature of the thermal initiator. Processes of particular interest are those in which the thermal curing preferably takes place at a temperature in the range from 95 to 180° C., with preference from 100 to 140° C. and very particularly preferably in the range from 105 to 130° C., in the injection mould. If the temperature during the thermal curing is too high, cracking can occur. If temperatures are too low, the coating often exhibits excessive adhesion to the metal of the injection mould, and to some extent it is also possible here to improve scratch resistance by using a relatively high temperature during the thermal curing. The ranges described above have proven to be particularly advantageous, but there is no intention of any resultant restriction.

According to the invention, the temperature of at least one portion of the injection mould is increased for the curing of the reactive mixture. Surprisingly, this is successful in giving curing of the coating, without any adverse effect on the moulding then obtained. The injection mould is particularly advantageously only heated to some extent for the curing of the coating. According to one advantageous embodiment, one portion of the injection mould is heated and is in contact with the reactive mixture, and one portion of the injection mould is not heated and is not in contact with the reactive mixture.

In this connection it may be stated that the term "injection mould" used herein is known to persons skilled in the art. It generally means that portion of an injection-moulding system which is needed for the shaping process. The said portion forms a cavity to which moulding composition can be charged. After cooling of the moulding composition, the injection mould can be opened intact in such a way that the resultant moulding can be removed from the injection mould. The injection mould therefore comprises conventional movable parts which permit opening in this way. For the shaping process, the injection mould conventionally has a metal portion which is in contact with the moulding composition, and the said portion or the surface of the said portion is therefore of decisive importance for the shaping process. For the purposes of the invention, the term injection mould in particular means the shaping portion, which can be composed of a plurality of portions. The heating described above means that very selective active heating acts on that portion of the injection mould in contact with the reactive mixture. This can in particular take place by induction, by passage of current or with heating elements, which are in contact with the said portion of the injection mould. The fact that other portions of the injection mould can likewise be heated by heat transfer by the said heating process is of no significance here, since a heat gradient is generally produced, where the temperature of the injection-mould surface in contact with the reactive mixture is higher than that of the injection-mould surface not in contact with the reactive mixture.

It is preferable that the temperature of at least one portion of the injection mould is increased by at least 5° C., particularly by at least 20° C. and very particularly by at least 30° C. In the case of heating by means of an indirect heating element, these data relate in particular to the temperature possessed by a heating element which is in contact with at least one portion of the injection mould and heats the said portion. In the case of heating by means of induction or by means of a current conducted through the injection mould, these data relate to the maximum temperature possessed by the injection mould.

This temperature increase can preferably be achieved within a short period. This temperature increase can preferably take place within one minute, particularly preferably within 30 seconds and very particularly preferably within 5 seconds. Particularly short times are desirable here, but these are delimited by the prevailing technical circumstances.

The injection mould can be heated prior to, during or after injection of the reactive mixture. In particular, advantages can be particularly achieved if heating of the injection mould is started prior to or during the injection of the reactive mixture. The maximum of the heating power which heats that surface of the injection mould that faces towards the moulding can preferably lie within a period which begins at the juncture of the minimum temperature of the uncoated moulding and ends less than 3 seconds, preferably less than 1 second, after injection of the reactive mixture. According to one particular aspect of the present invention, the maximum of the heating power which heats that surface of the injection mould that faces towards the moulding can be achieved prior to or during injection of the reactive mixture. This embodiment is surprisingly successful in giving surfaces with particularly little cracking on the mouldings, which are particularly easy to demould.

The start of, and the rate of, the polymerization reaction (curing) of the reactive mixture can moreover be adjusted via the selection of the nature and of the proportion of the thermal initiator, and also via the selection of the mould temperature. The start of the curing process can moreover be controlled via the selection of the polyfunctional (meth)acrylates present in the reaction mixture.

According to an advantageous embodiment of the inventive process, a pre-cured reactive mixture can, after thermal curing, be cured by irradiation at a temperature in the range from 0° C. to 120° C., preferably from 10° C. to 40° C. Conventional radiation sources can be used for this purpose, as a function of the nature of the initiator. The curing can particularly preferably take place by UV radiation, where the wavelength of the radiation source used can be in particular in the range from 100 nm to 500 nm, preferably from 200 to 400 nm.

Systems which in principle permit coating with a reactive mixture are described inter alia in the documents described above: JP 11300776 and JP 2005074896. The disclosure of the said publications is incorporated into this application. However, the said publications do not describe these systems in which the temperature at least of one portion of the injection mould can be altered by more than 10° C. within one minute. Systems of this type are novel and therefore likewise provided by the present invention. The system preferably permits a change of the temperature of at least one portion of the injection mould by more than 10° C., particularly preferably more than 20° C., within 5 seconds.

These embodiments are inter alia achieved in that at least one portion of the injection mould can be heated by electrical current. Injection-moulding systems with an electrically heatable injection mould are described inter alia in EP-A-1 065 037, WO96/29188 and U.S. Pat. No. 5,234,627, the disclosure of which is incorporated by way of reference. The heating here can take place directly by electrical heating of the surface, or indirectly by induction or with a heating element connected to the shaping surface of the injection mould. Indirect methods are preferred here. A ceramic heating element or a Peltier element is particularly suitable. The injection mould here can be heated by one or more of the methods described above.

The heating of an injection mould by induction is described inter alia in the publication DE 201 21 777 U1. The disclosure of the said publication is incorporated into the present application.

Peltier elements are electrothermal converters which produce a temperature difference when a current passes or cause a current to flow when there is a temperature difference. TEC (from thermoelectric cooler in English) is a conventional abbreviation for Peltier elements and Peltier coolers. These elements can be obtained commercially.

Ceramic heating elements encompass a ceramic which can be heated by current. Ceramic here is the term for inorganic materials which can encompass inter alia oxides, nitrides and similar substances. WO 00/34205, DE 35 12 483, DE 35 19 437 and DE 37 34 274 have examples of materials of this type. The disclosure of the said publications is incorporated into this application.

According to one particular embodiment, the injection nozzle by way of which the reactive mixture is injected into the injection mould can be equipped with a Peltier element. This achieves surprising advantages with regard to the operating times of the system. These can in particular be achieved if that side of the nozzle facing towards the injection mould is heated and that side of the nozzle facing away from the injection mould is cooled.

One particular system for conduct of the inventive process has a cooling system by way of which at least one portion of the injection mould can be cooled. The cooling can take place in particular with known coolants, such as air, water or similar fluids. The coolant is preferably passed through channels which run in the vicinity of the heated injection mould. In the case of heating of the injection mould by induction, the cooling channels can run directly through the injection mould, or have been provided at the surface opposite to the injection-mould surface that moulds the plastics moulding. In the case of indirect heating of the injection mould, for example by ceramic elements or by Peltier elements, coolant channels can have been provided between the heating element and the injection-mould surface that moulds the plastics moulding. If the injection mould is directly heated by current, the coolant channels can run directly through the injection mould or can have been provided at the surface opposite to the injection-mould surface that moulds the plastics moulding.

The present invention in particular provides coated mouldings which have an excellent property profile and are therefore versatile.

The moulding in particular features high scratch resistance which can, for example, be determined by a friction-wheel test. Mouldings of particular interest are coated, transparent mouldings whose haze value in an ASTM 1044 (12/05) scratch-resistance test (applied weight 500 g, number of cycles=100) increases by at most 10%, particularly preferably by at most 6% and very particularly preferably by at most 3%. The ASTM 1044 (12/05) scratch resistance can moreover be measured by using the decrease in gloss at 20° (applied weight 500 g, number of cycles=100). The decrease in gloss at 20° exhibited here by preferred coated mouldings in an ASTM 1044 (12/05) scratch-resistance test (applied weight 500 g, number of cycles=100) is at most 10%, particularly preferably at most 6% and very particularly preferably at most 3%. The decrease in gloss at 20° can be determined to DIN EN ISO 2813. Determination of gloss change can by way of example be used to measure the scratch resistance of coloured mouldings or of coloured coatings.

The inventive mouldings moreover exhibit excellent adhesion of the coating, which can be studied by the cross-cut test. For this, cross-cuts are made in the coating which is thus divided into individual segments in the manner of a chess board. This generally forms at least 20 individual segments, preferably at least 25 individual segments. The distance between the lines here is about 1 mm. An adhesive tape of width 25 mm is then applied and in turn peeled away. The peel force of the adhesive tape per $cm^2$, measured to DIN EN ISO 2409, is about 10N for each 25 mm of width. An example of an adhesive tape that can be used to carry out the test is the type marketed by Tesa as 4104. The cross-cut test value achieved by the coated mouldings is preferably at most 1, particularly preferably 0. A value of 1 is achieved by the coated mouldings if the proportion of individual segments peeled is not substantially more than 5%. If none of the individual segments is peeled (0%), the value achieved by the coated mouldings is 0.

Preferred coatings are moreover free from cracks and exhibit high chemicals resistance. The coatings therefore in particular resist ethanol, ethanol/water (70/30), petroleum spirit, pancreatin, and sulphuric acid (1% strength), and no stress cracks are formed here through contact with the said compounds.

Preferred mouldings can have a modulus of elasticity greater than or equal to 1200 MPa, preferably greater than or equal to 1600 Mpa, to ISO 527 (at 1 mm/min). Inventive mouldings can moreover have a Charpy impact resistance greater than or equal to 10 $kJ/m^2$, preferably greater than or equal to 15 $kJ/m^2$, to ISO179.

It is moreover possible to produce plastics with tensile strengths greater than or equal to 55, preferably greater than or equal to 60, to DIN 53 455-1-3 (at 1 mm/min), these having excellent scratch resistance.

It is particularly surprising that the transmittance $\tau_{D65}$ of the scratch-resistant moulding can be ≥88%, preferably ≥90%, to DIN 5036, Part 3. The mechanical and/or optical properties listed above for the moulding are not intended to bring about any restriction of the invention. Instead, the said data serve to describe the particularly excellent properties of the moulding, which can be achieved together with good scratch resistance.

The mouldings of the present invention can moreover exhibit exceptional weathering resistance. Weathering resistance in the xenon test is therefore preferably at least 1000 hours, particularly preferably at least 2000 hours. This resistance can by way of example be determined through a small decrease in transmittance or through a small decrease in scratch resistance. In particular, coated mouldings of particular interest are those whose transmittance decreases at most by 10%, particularly preferably by at most 5%, based on the transmittance value at the start of irradiation, after 2000 hours of xenon irradiation. Preferred mouldings can moreover exhibit an increase in haze value to at most 25%, particularly preferably to at most 15%, in an ASTM 1044 (12/05) scratch-resistance test (applied weight 500 g, number of cycles=100), after 2000 hours of xenon irradiation. It is also possible to determine scratch resistance after xenon irradiation by way of the decrease in gloss. Preferred coated mouldings here exhibit a decrease in gloss at 20° of at most 25%, particularly preferably at most 20% and very particuarly preferably at most 15% in an ASTM 1044 (12/05) scratch-resistance test (applied weight 500 g, number of cycles=100) after 2000 hours of xenon irradiation.

Preferred coatings obtained using an inventive coating composition moreover exhibit high resistance in a test replicating changing climatic conditions, where only slight cracking occurs despite deformation of the substrate. The test replicating changing climatic conditions can preferably be carried out by using the load program described in the document "BMW PR 303—Part d".

The invention claimed is:

1. A process for the production of a coated moulding, comprising injecting a moulding composition into an injection mould and cooling the composition to obtain a moulding, and altering the injection mould in such a way as to produce an intermediate space between a surface to be coated of the moulding and the inner surface of the injection mould, and charging a reaction mixture to the resultant intermediate space with the injection moulding and the reactive mixture is first thermally cured and after the thermal curing, cured by irradiation, wherein the temperature of at least a portion of the injection mould is increased for the curing of the reactive mixture, wherein the temperature of at least one portion of the injection mould is increased by at least 20° C. within 5 seconds.

2. The process according to claim 1, wherein one portion of the injection mould is heated and is in contact with the reactive mixture, and one portion of the injection mould is not heated and is not in contact with the reactive mixture.

3. The process according to claim 1, wherein the temperature of at least one portion of the injection mould is increased by at least 30° C.

4. The process according to claim 1, wherein the moulding composition comprises at least 50% by weight of polymethyl methacrylate, of poly(meth)acrylimide, or of polymethyl methacrylate copolymers, or mixtures thereof.

5. The process according to claim 4, wherein the reactive mixture comprises at least 40% by weight of (meth)acrylates having at least two double bonds.

6. The process according to claim 1, wherein the reactive mixture comprises at least one (meth)acrylate having three or more double bonds and that the proportion of (meth)acrylates having three or more double bonds is at least 25% by weight, based on the weight of the reactive mixture.

7. The process according to claim 1, wherein the dynamic viscosity of the reactive mixture is in the range of from 1 to 200 mPa·s at 25° C.

8. The process according to claim 1, wherein the reactive mixture comprises from 0.03% by weight to 5% by weight of thermal initiator or from 0.01% by weight to 3% by weight of photoinitiator, or both, each based on the weight of the reactive mixture.

9. The process according to claim 1, wherein the thickness of the coating is in the range of from 5 µm to 75 µm.

10. The process according to claim 1, wherein the moulding composition is injected at a temperature in the range of from 220 to 330° C. into the injection mould, and that the moulding composition is cooled to a temperature in the range of from 70 to 150° C. before the reactive mixture is injected into the intermediate space.

11. The process according to claim 1, wherein the reactive mixture is thermally cured at a temperature in the range of from 95 to 180° C. in the injection mould.

12. The process according to claim 1, wherein the thermally cured reactive mixture is cured at a temperature in the range of from 10 to 40° C. by UV irradiation.

13. The process according to claim 1, wherein at least a portion of the injection mould is heated by electrical current.

14. The process according to claim 1, wherein the maximum of the heating power which heats the injection-mould surface facing towards the moulding lies within a period which begins at the juncture of the minimum temperature of the uncoated moulding and ends less than one second after injection of the reactive mixture.

15. The process according to claim 1, wherein the maximum of the heating power which heats the injection-mould surface facing towards the moulding is achieved prior to or during the injection of the reactive mixture.

16. The process according to claim 4, wherein the reactive mixture comprises at least 60% by weight of (meth)acrylates having at least two double bonds.

17. The process according to claim 1, wherein the moulding composition is injected at a temperature in the range of from 220 to 330° C. into the injection mould, and that the moulding composition is cooled to a temperature in the range of from 70 to 90° C. before the reactive mixture is injected into the intermediate space.

18. The process according to claim 1, wherein the reactive mixture is thermally cured at a temperature in the range of from 100 to 140° C. in the injection mould.

* * * * *